April 28, 1942.   B. J. DENNISON   2,281,027

PROCESS FOR MANUFACTURING LAMINATED ARTICLES

Filed July 31, 1940

Inventor
BROOK J. DENNISON

By Olew E. Bee
Attorney

Patented Apr. 28, 1942

2,281,027

UNITED STATES PATENT OFFICE 2,281,027

PROCESS FOR MANUFACTURING LAMINATED ARTICLES

Brook J. Dennison, Aspinwall, Pa., assignor to Pittsburgh Plate Glass Company, Allegheny County, Pa., a corporation of Pennsylvania Application July 31, 1940, Serial No. 348,775

5 Claims. (Cl. 154—2)

The present invention relates to a process of manufacturing laminated articles and more particularly to articles which include a sheet of glass and a thin sheet of ply wood or veneer.

One object of the invention is the provision of means whereby the lamination of wood to glass is facilitated and the layer of wood is protected during such lamination.

Other objects and advantages of the invention will become more apparent from the following detailed description of a preferred embodiment thereof.

There has recently been evidenced a demand for panels of laminated glass-wood as a construction material. The wood veneer is protected by the layer of glass from surface deterioration and yet at the same time the beauty and attractiveness of the wood grain is not impaired.

In general the laminated glass-wood is manufactured by processes similar to those employed in the manufacture of ordinary safety glass. The sheets of glass and wood are assembled with a layer of thermoplastic material interposed therebetween and the assembly is subjected to heat and pressure to bond the several elements thereof into a composite unit. To establish a satisfactory union between the glass and the wood it is ordinarily necessary to subject the assemblies to a final pressing in an autoclave. Since the wood layer is porous it is essential that it be kept from contact with the diethylene glycol or other fluid in the autoclave. The usual practice therefore is to place the assemblies in rubber bags or other types of enclosures which will serve the desired purpose.

Obviously such expedient materially increases the cost of production by necessitating extra operations and reducing the speed of the manufacturing process.

Briefly stated, the present invention contemplates the formation of an impermeable envelope around the sheet of wood from the elements of the assembly, thus eliminating the need for separate protective coverings.

Figure 1:
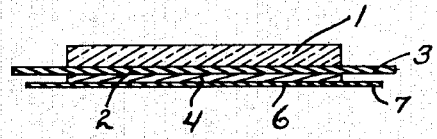
Figure 2:
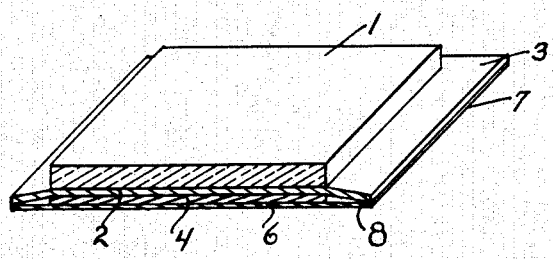
Figure 3:
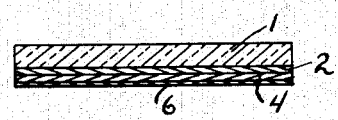

In the drawing Figure 1 is a vertical sectional view of an assembly prior to the laminating operation. Figure 2 is a fragmentary isometric view of an assembly after lamination; and Figure 3 is a vertical sectional view of a laminated article resulting from the proposed process.

Referring to the drawing a sheet 1 of glass and a sheet 4 of wood or other similar material are assembled with an interposed layer 2 of thermoplastic material. The layer 2 extends beyond the edges of the sheets 1 and 4 and forms a border 3. The sheet 4 has secured thereto a backing 6 of metal foil which extends beyond the edges thereof, forming a bordering portion 7.

The assembly is subjected to a preliminary pressing under the influence of which the several elements are temporarily secured together in order that they may be handled and the projecting border 3 of the thermoplastic layer and the border 7 of the metal foil are bonded together at 8, to form an impermeable envelope for the sheet 4 of wood. The assembly is then placed directly in an autoclave wherein pressure exerted by a heated fluid bonds the several elements into a composite unit. Since the layer 4 of wood is entirely enclosed the autoclave fluid will not penetrate therein to preclude the formation of a satisfactory bond between the wood and glass.

After the lamination operation has been completed the edges of the unit are trimmed to remove the surplus material forming the envelope and the laminated article is ready for use.

Any of the thermoplastic materials ordinarily used in the production of safety glass, including cellulosic derivatives, the acrylate resins and the polyvinyl acetals may be used to unite sheets of wood and glass. Although it is preferred to use a polyvinyl butyral because of its increased resistance to fluid penetration, it is not intended to restrict the process to any particular thermoplastic material.

It will also be apparent that various modifications in the types of materials selected and the conditions under which the process is performed are possible without departing from the spirit of the invention or the scope of the appended claims.

What I claim is:

1. A process of manufacturing a laminated article which comprises superposing a plurality of laminations with interposed plastic adhesive material in sheet form extending beyond the edges of the laminations, applying covering non-porous sheet material also extending beyond the edges of the laminations, closing the extending edge portions of the covering and interposed plastic, and subjecting the assembled elements to heat and fluid pressure.

2. A process of manufacturing a laminated article which comprises superposing a plurality of laminations with interposed plastic adhesive material in sheet form extending beyond the edges of the laminations, applying a covering non-porous sheet material also extending beyond the edges of the laminations, closing the extending edge portions of the covering and interposed plastic, subjecting the assembled elements to heat and fluid pressure, and subsequently trimming the extending edge portions from the laminated article.

3. A process of manufacturing a laminated article which comprises assembling a sheet of glass and a sheet of wood, interposing a layer of thermoplastic material between the glass and wood, covering the wood with a non-porous backing, uniting the thermoplastic material to the non-porous backing to form a protective envelope around the sheet of wood, and subjecting the assembly to heat and fluid pressure.

4. A process of manufacturing a laminated article which comprises assembling a sheet of glass and a sheet of wood, interposing a layer of thermoplastic material between the glass and wood, adhering a non-porous backing to the wood, bonding the thermoplastic material to the non-porous backing to form an impermeable envelope for the sheet of wood, and subjecting the assembly to heat and fluid pressure to bond the several elements into a composite unit.

5. A process of manufacturing a laminated article which comprises assembling a sheet of glass and a sheet of wood, interposing a layer of thermoplastic material between the glass and wood and extending beyond the edges thereof, adhering a non-porous backing of metal foil to the wood, the backing also extending beyond the edges of the wood, bonding the extending portions of the thermoplastic material and metal foil together to form an impermeable envelope for the sheet of wood, and subjecting the assembly to heat and fluid pressure to bond the several elements into a composite unit.

BROOK J. DENNISON.